US010222717B2

(12) United States Patent
Kaneeda et al.

(10) Patent No.: US 10,222,717 B2
(45) Date of Patent: Mar. 5, 2019

(54) HYDROPHOBIC SILICA FOR ELECTROPHOTOGRAPHIC TONER COMPOSITION

(71) Applicant: Evonik Degussa GmbH, Essen (DE)

(72) Inventors: Masanobu Kaneeda, Suzuka (JP); Rainer Lamann, Bergheim (DE); Jens Peltzer, Grafschaft (DE); Farideh Yamchi, Hürth (DE); Jürgen Behnisch, Rheinbach (DE)

(73) Assignee: Evonik Degussa GmbH, Essen (DE)

( * ) Notice: Subject to any disclaimer, the term of this patent is extended or adjusted under 35 U.S.C. 154(b) by 69 days.

(21) Appl. No.: 15/359,758

(22) Filed: Nov. 23, 2016

(65) Prior Publication Data

US 2017/0168409 A1 Jun. 15, 2017

(30) Foreign Application Priority Data

Dec. 9, 2015 (EP) .................................... 15198652

(51) Int. Cl.
C09C 1/30 (2006.01)
G03G 9/08 (2006.01)
G03G 9/10 (2006.01)
C01B 33/18 (2006.01)
G03G 9/097 (2006.01)

(52) U.S. Cl.
CPC ............. *G03G 9/10* (2013.01); *C01B 33/18* (2013.01); *C09C 1/3063* (2013.01); *C09C 1/3081* (2013.01); *G03G 9/0819* (2013.01); *G03G 9/09716* (2013.01); *G03G 9/09725* (2013.01); *C01P 2004/32* (2013.01); *C01P 2004/54* (2013.01); *C01P 2004/61* (2013.01); *C01P 2004/62* (2013.01); *C01P 2004/64* (2013.01); *C01P 2006/82* (2013.01)

(58) Field of Classification Search
CPC .......... C01B 33/12; C01B 33/18; G03G 9/10; G03G 9/0819; G03G 9/09725; G03G 9/09716; C09C 1/3081; C09C 1/3063; C01P 2004/62; C01P 2004/64; C01P 2006/82; C01P 2004/54; C01P 2004/32; C01P 2004/61
See application file for complete search history.

(56) References Cited

U.S. PATENT DOCUMENTS

2002/0061457 A1 5/2002 Okuno et al.
2011/0244382 A1* 10/2011 Christopher ....... G03G 9/09725
430/105

FOREIGN PATENT DOCUMENTS

| DE | 102007035951 A1 | 2/2009 |
| EP | 1031885 B1 | 8/2000 |
| EP | 1316589 A2 | 6/2003 |
| JP | S58132757 A | 8/1983 |
| JP | S59034539 A | 2/1984 |
| JP | H10312089 A | 11/1998 |
| JP | 2002108001 A | 4/2002 |

OTHER PUBLICATIONS

Snowtex Product Page "ST-OL Brochure" http://www.nissanchem-usa.com/products/snowtex/ Printed Jun. 6, 2018 (Year: 2018).*
European Search Report; Application No. 15198652.8; dated Jun. 17, 2016.
Stöber et al.; Controlled growth of monodisperse silica spheres in the micron size range, Journal of Colloid and Interface Science, vol. 26, pp. 62-69 (1968).
Iler; The Chemistry of Silica, Wiley, New York, pp. 331-337 (1979).

* cited by examiner

*Primary Examiner* — Anthony J Zimmer
(74) *Attorney, Agent, or Firm* — Michael Best & Friedrich LLP

(57) ABSTRACT

The invention relates to a hydrophobic silica powder which is unprecedentedly insensitive to environmental humidity with which electrophotographic toner can possess stable electro static charge that leads to stable quality of printed image.
The hydrophobic silica powder has the following physico-chemical properties;
  average primary particle size (D) is 30-2000 nm,
  B*D<430 nm, while B stands for weight % of adsorbed water vapor on silica (100 weight %) when the partial pressure of water to the equilibrium vapor pressure of water at 25° C. is 80% and D stands for average primary particle size (nm) of the silica powder,
  B/C<2.7, while C stands for weight % of adsorbed water vapor on silica (100 weight %) when the partial pressure of water to the equilibrium vapor pressure of water at 25° C. is 20%, and
  carbon content>0.30 wt.-%.

12 Claims, No Drawings

HYDROPHOBIC SILICA FOR ELECTROPHOTOGRAPHIC TONER COMPOSITION

The invention relates to hydrophobic silica, a process for the preparation thereof and the use in toner.

Office-automation equipment such as copying machines, laser printers, etc. utilizing electrophotographic technology forms images by means of an electrophotographic developer. Usual electrophotographic developers of two-component system uses a toner which comprises colored fine resin powders and a carrier. The carrier is made of magnetic or nonmagnetic particles, which serves for electrically charging and carrying the toner. The toner and the carrier are stirred and mixed with each other in a developing machine and are electrically charged as a result of mutual friction. An electrostatic latent image that has been formed by exposure is developed by the utilization of this charging.

Because the toner is in the form of fine powder, its powder characteristics such as fluidity and charging characteristics are also of importance so that it may sufficiently function in the electrophotographic process. Since being 10 μm or larger in particle size, the conventional types of toner could have been managed to handle as they were mere crushed particles. The current types of toner has accomplished much improved printing quality because they are in the form of finer powders with a particle size between 5 and 8 μm. This toners need various external additives.

Since toner is controlled by tribo-electrostatic charge, the charge must be stable under various environmental conditions. Environments where toner is used is generally from low-humidity environment whose relative humidity is around 20% to high-humidity environment whose relative humidity is 80% or even higher. The charge is controlled by integrated charge-control agents in the toner resin and external additives. Especially, external additives play crucial role.

External additives that have conventionally been used in general over many years are metal oxide particles such as surface-modified silica and titania produced by a dry process as they show a low aggregation tendency and are easy to evenly disperse on the toner surface (JP S58-132757 A, JP S59-034539 A, JP H10-312089 A).

JP 2002-108001 A proposes the addition of a fine silica powder manufactured by the so-called sol-gel method to toner particles. Although these methods can surely provide excellent printing images under adequate environmental conditions, properties of the surface of the fine silica powder are liable to be hygroscopic because of remaining silanol groups on the surface. The silanol groups can uptake moisture, which accounts for deterioration of electrostatic charge of the toner therefore the printing image under highly humid environment.

The object of the present invention is to provide a silica powder which is unprecedentedly insensitive to environmental humidity. It is useful for forming an extremely superior external additive in toners.

The abovementioned objects are achieved by the silica powder defined in more detail in the following description, the examples and the claims.

The present invention therefore relates to hydrophobic silica powder, characterized by the following physicochemical properties:

average primary particle size D is 30-2000 nm, preferably 40-1000 nm, particularly preferably 50-400 nm, very particular preferably 50-200 nm, determined by TEM, $B*D<430$ nm, preferably $<375$ nm, particularly preferably between 65 and 350 nm, whilst B stands for wt.-% of adsorbed water vapor on silica (100 wt.-%) when the partial pressure of water to the equilibrium vapor pressure of water at 25° C. is 80% and D stands for average primary particle size in nm of the silica powder, $B/C<2.7$, preferably $<2.5$, particularly preferably between 1.0 and 2.4, whilst C stands for weight % of adsorbed water vapor on silica (100 wt.-%) when the partial pressure of water to the equilibrium vapor pressure of water at 25° C. is 20% and carbon content>0.30 wt.-%, preferably >0.40 wt.-%, particularly preferably between 0.50 wt.-% and 5.00 wt.-%.

The aspect ratio of the primary particles of the hydrophobic silica powder of the present invention can be 1.0-1.5, preferably 1.0-1.3, particularly preferably 1.0-1.2.

The hydrophobicity of the hydrophobic silica of the present invention can be higher than 50%, preferably higher than 55%, particularly preferably higher than 63%.

The pH-value of the hydrophobic silica of the present invention is between 2.5-9.5, preferably 3.5-8.5, especially preferably 4.5-8.0.

The hydrophobic silica of the present invention can be a powder.

The hydrophobic silica of the present invention can be a colloidal silica.

The hydrophobic silica powder of the present invention is unprecedentedly insensitive to environmental humidity with which toner can possess stable electrostatic charge that leads to stable quality of printed image.

The present invention furthermore relates to a process for the preparation of hydrophobic silica of the present invention
a. preparation of the silica dispersion,
b. drying the dispersion of step a to obtain hydrophilic silica powder,
c. aging treatment of the hydrophilic silica powder of step b at a temperature between 100 and 170° C. and the temperature of step c is higher than the temperature of step b,
d. hydrophobizing the silica powder of step c.

The silica dispersion of step a can be a mono-dispersed colloidal silica dispersion. The mono-dispersed colloidal silica dispersion is available by using of alkoxy silane, which is known as sol-gel process or Stöber process (Werner Stöber, Arthur Fink, Ernst Bohn, Controlled growth of monodisperse silica spheres in the micron size range, Journal of Colloid and Interface Science, Vol. 26, pp. 62-69 (1968)), or of alkaline water glass and acid by means of colloidal process (Ralph K. Iler, The Chemistry of Silica, Wiley, N.Y., pp. 331-337 (1979)). The acid can be hydrochloric acid or sulfuric acid for example. These monodispersed colloidal silica dispersions are generally known and commercially available as dispersion in water and/or organic solvent. Available aqeous dispersions from Evonik Industries AG are for example IDISIL™ EM13530P, EM7530P or EM5530P.

The silica dispersion may be dried by generally known processes in step b, such as by means of drying oven, rotary evaporator, paddle dryer, freeze dryer, fluidized bed drier, and spray dryer. The dispersion is preferably de-ionized before step b by a cation exchanger so that a pH-value of 2.2-3.8, preferably 2.4-3.5, particularly preferably 2.5-3.2 is obtained. Besides the above direct drying method, silica powder may also be obtained by drying a filter cake from the dispersion by using a filter press. Any known agents may be added to enhance precipitation, gelation or aggregation before filtration. Any known means may be applicable to dry the filter cake. It should be noted that the environmental temperature in the drying process b have to be maintained lower than that in the later aging step c. The drying in step b can be preferably carried out at lower temperature than 150° C., preferably lower than 130° C., particularly preferably −30° C.-100° C. The drying in step b can be preferably carried out in a freeze dryer, drying oven under ambient pressure or rotary evaporator under reduced pressure. The silica in step b can be dried until the moisture of the silica is less than 5.0 weight %, preferably less than 3.0 weight %.

Then the dried silica of step b undergoes the aging process (step c) before hydrophobization, and the number of silanol groups on the surface reduces under control. Especially, neighboring silanol groups condense to leave such silanol groups on the surface that is geometrically isolated. Step c may be done at controlled temperature and moisture with or without any catalyst. It is carried out at a temperature of 100° C.-170° C., preferably 110° C.-160° C. The temperature in the later aging step c can be at least 10° C., preferably at least 30° C., more preferably at least 50° C., particularly preferably at least 70° C., higher than that in the drying step b. The silica in step c can be aged until the moisture of the silica is <2.0%, preferably <1.5%. The aging process of step c can be carried out under either ambient air or an inert gas such as nitrogen or argon.

Although not limited specially, the hydrophobing agents used for step d to obtain the hydrophobic silica according to the present invention can be silazanes, cyclic organosiloxanes, silicone oils and silane coupling agents.

Silazanes include hexamethyldisilazane (HMDS), hexaethyldisilazane, tetramethyldisilazane, hexabuthyldisilazane, hexapropyldisilazane, hexapenthyldisilazane, hexamethylcyclotrisilazane, 1,3-divinyltetramethyldisilazane, octamethylcyclotetrasilazane and divinyltetramethyldisilazane.

Cyclic organosiloxanes include hexaphenylcyclotrisiloxane, octaphenylcyclotetrasiloxane, tetravinyltetramethylcyclotetrasiloxane, hexamethylcyclotrisiloxane, octamethylcyclotetrasiloxane, pentamethylcyclotetrasiloxane, tetramethylcyclotetrasiloxane, octamethylcyclotetrasiloxane, decamethylcyclopentasiloxane, dodecamethylcyclohexasiloxane, tetramethyltetrahydrogencyclotetrasiloxane, tetramethyltetraphenylcyclotetrasiloxane, tetramethyltetratrifluoropropylcyclotetrasiloxane and pentamethylpentatrifluoropropylcyclopentasiloxane.

Silicone oils include organopolysiloxane, etc. from a low viscosity to a high viscosity such as dimethylpolysiloxane, methylphenylpolysiloxane, methylhydrogenpolysiloxane, methyltrimethicone, copolymer of methylsiloxane/methylphenylsiloxane. In addition, it is also possible to use rubber-like dimethylpolysiloxanes of a high degree of polymerization, higher alkoxy-modified silicones such as stearoxy silicones, etc., higher fatty acid-modified silicones, alkyl-modified silicones, amino-modified silicones, fluorine-modified silicones, etc. It is also possible to use organopolysiloxanes which have a reactive functional group at one end or at both ends. Those organopolysiloxanes which are expressed by the following formula (1) are suitable for use:

$$Xa\text{-}(SiR_2O)_n\text{—}SiR_2\text{—}Xb \tag{1}$$

The group R in the formula may be identical or different as an alkyl group consisting of methyl group or ethyl group, a part of which may be substituted by an alkyl group containing one of the functional groups incl. vinyl group, phenyl group and amino group, the groups Xa and Xb may be identical or different and are reactive functional groups include halogen atom, hydroxyl group, alkoxy group. n is an integer showing the degree of polymerization of siloxane linkage and is between 1 and 1000.

Silane coupling agents include, for example, 1,3-divinyltetramethyldisiloxane, 1,3-diphenyltetramethyldisiloxane, 3-aminopropyltrimethoxysilane, 3-aminopropylmethyldiethoxysilane, i-butyltriethoxysilane, i-buthyltrimethoxysilane, i-propyltriethoxysilane, i-propyltrimethoxysilane, N-beta (aminoethyl) gamma-aminopropyltrimethoxysilane, N-beta (aminoethyl) gamma-aminopropylmethyldimethoxysilane, n-octadecyltrimethoxysilane, N-phenyl-gamma-aminopropyltrimethoxysilane, n-buthyltrimethoxysilane, n-propyltriethoxysilane, n-propyltrimethoxysilane, n-hexadecyltrimethoxysilane, o-methylphenyltrimethoxysilane, p-methylphenyltrimethoxysilane, tert-butyldimethylchlorosilane, a-chloroethyltrichlorosilane, beta-(3,4-epoxycyclohexyl) ethyltrimethoxysilane, beta-(3,4-epoxycyclohexyl) ethyltrimethoxysilane, beta-chloroethyltrichlorosilane, beta-(2-aminoethyl) aminopropyltrimethoxysilane, gamma-(2-aminoethyl) aminopropylmethyldimethoxysilane, gamma-anilinopropyltrimethoxysilane, gamma-aminopropyltriethoxysilane, gamma-aminopropyltrimethoxysilane, gamma-glycidoxypropyltrimethoxysilane, gamma-glycidoxypropylmethyldiethoxysilane, gamma-glycidoxypropylmethyldimethoxysilane, gamma-chloropropyltrimethoxysilane, gamma-chloropropylmethyldimethoxysilane, gamma-methacryloxypropyltrimethoxysilane, gamma-mercaptopropyltrimethoxysilane, aminopropyltriethoxysilane, aminopropyltrimethoxysilane, allyldimethylchlorosilane, allyltriethoxysilane, allylphenyldichlorosilane, isobutyltrimethoxysilane, ethyltriethoxysilane, ethyltrichlorosilane, ethyltrimethoxysilane, octadecyltriethoxysilane, octadecyltrimethoxysilane, octyltrimethoxysilane, chloromethyldimethylchlorosilane, diethylaminopropyltrimethoxysilane, diethyldiethoxysilane, diethyldimethoxysilane, dioctyl aminopropyltrimethoxysilane, diphenyldiethoxysilane, diphenyldichlorosilane, diphenyldimethoxysilane, dibuthylaminopropyldimethoxysilane, dibuthylaminopropyltrimethoxysilane, dibuthylaminopropylmonomethoxysilane, dipropylaminopropyltrimethoxysilane, dihexyldiethoxysilane, dihexyldimethoxysilane, dimethylaminophenyltriethoxysilane, dimethylethoxysilane, dimethyldiethoxysilane, dimethyldichlorosilane, dimethyldimethoxysilane, decyltriethoxysilane, decyltrimethoxysilane, dodecyltrimethoxysilane, triethylethoxysilane, triethylchlorosilane, triethylmethoxysilane, triorganosilyl acrylate, tripropylethoxysilane, tripropylchlorosilane, tripropylmethoxysilane, trihexylethoxysilane, trihexylchlorosilane, trimethylethoxysilane, trimethylchlorosilane, trimethylsilane, trimethylsilylmercaptan, trimethylmethoxysilane, trimethoxysilyl-gamma-propylphenylamine, trimethoxysilyl-gamma-propylbenzylamine, naphthyltriethoxysilane, naphthyltrimethoxysilane, nonyltriethoxysilane, hydroxypropyltrimethoxysilane, vinyldimethylacetoxysilane, vinyltriacetoxysilane, vinyltriethoxysilane, vinyltrichlorosilane, vinyltris (beta-methoxyethoxy) silane, vinyltrimethoxysilane, phenyltriethoxysilane, phenyltrichlorosilane, phenyltrimethoxysilane, butyltriethoxysilane, butyltrimethoxysilane, propyltriethoxysilane, propyltrimethoxysilane, bromomethyldimethylchlorosilane, hexamethyldisiloxane, hexyltrimethoxysilane, benzyldimethylchlorosilane, pentyltrimethoxysilane, methacryloxyethyldimethyl (3-trimethoxysilylpropyl) ammonium chloride, methyltriethoxysilane, methyltrichlorosilane, methyltrimethoxysilane, methylphenyldimethoxysilane and monobutylaminopropyltrimethoxysilane. These hydrophobing agents may be used independently or in combination with another agent or other agents.

Hydrophobization of the hydrophilic silica powder of step c may be performed in publicly known methods. When a dry process is concerned, for example, a hydrophobing agent may be sprayed onto the silica or be introduced in a vapor form into the reaction vessel while it is being stirred or fluidized by flowing gas. In a wet process, the silica of step c may be dispersed in a solvent like toluene, and then heated or heated to reflux as required after addition of a hydrophobing agent. Or it may further be heated at high temperatures after distilling away the solvent. No limitation applies to the method of hydrophobization as well when two or more hydrophobing agents are used so that they may be put to the reaction either simultaneously or sequentially.

The hydrophobization of step d can be preferably carried out by spraying a hydrophobing agent on the silica of step c.

The hydrophobing agent can be preferably an alkylsilane, a polydimethy siloxane or a silazane, particularly preferably octyltrimethoxysilane or hexamethylsilazane.

If necessary the silica of the present invention can undergo any milling process at any time, such as after drying (step b), aging treatment (step c), or hydrophobization (step d). It may also be done more than once. Particularly preferred is a milling system comprising a jet mill, characterized in that the mill in the milling system is operated in the milling phase with an operational medium selected from the group consisting of gas and/or vapor, preferably steam, and/or a gas comprising steam, and in that the milling chamber is heated in a heating phase, i.e. before the actual operation with the operational medium, such that the temperature in the milling chamber and/or at the mill outlet is higher than the dew point of the vapor and/or operational medium.

The present invention furthermore relates to a toner composition, comprising the inventive hydrophobic silica powder. The toner composition according to the present invention can be obtained by mixing colored particles and the inventive hydrophobic silica powder by means of a stirrer such as Henschel mixer.

Colored particles can contain a binder resin and a coloring agent. The method for producing them is subject to no special limitation, but they can typically be produced, for example, in pulverizing process (a process in which a coloring agent is molten into a thermoplastic resin as binder resin component and mixed for uniform dispersion to form a composition, which is then pulverized and classified to obtain the colored particles) or in polymerization process (a process in which a coloring agent is molten or dispersed into a polymerizable monomer as raw material for the binder resin and then suspended in a water-based dispersion medium containing a dispersion stabilizer after addition of a polymerization initiator and the suspension is heated up to a predefined temperature to initiate polymerization to obtain the colored particles by filtration, rinsing, dewatering and drying after completed polymerization).

The binder resins include resins which have widely been used for some time for toners such as, for example, polymers of styrene and its substitution products such as polystyrene, poly-p-chlorostyrene and polyvinyl toluene, styrene copolymers such as styrene-p-chlorostyrene, styrene-propylene, styrene-vinyltoluene, styrene-vinylnaphthalene, styrene-methyl acrylate, styrene-ethyl acrylate, styrene-butyl acrylate, styrene-octyl acrylate, styrene-methyl methacrylate, styrene-ethyl methacrylate, styrene-butyl methacrylate, styrene-alpha-methyl chloromethacrylate, styrene-acrylonitrile, styrene-vinylmethylether, styrene-vinylethylether, styrene-vinylmethylketone, styrene-butadiene, styrene-isoprene, styrene-acrylonitrile-indene, styrene-maleic acid and styrene-maleate, polymethyl methacrylate, polyvinyl chloride, polyvinyl acetate, polyethylene, polypropylene, polyester, polyurethane, polyamide, epoxy resins, polyvinyl butyral, polyacrylic resins, rosin, modified rosin, terpene resins, phenol resins, aliphatic resins or alicyclic hydrocarbon resins and aromatic petroleum resins. They may be used independently or by mixture. Publicly known mold release agent, antistatic agent, etc. may further be added to the said resins within the range not departing from the purpose of the present invention.

Every pigment and/or dye including carbon black and titanium white can be used as the coloring agent contained in the colored particles. The colored particles may contain any magnetic material. The materials used here include iron oxides such as magnetite, gamma-iron-oxide, ferrite and iron-excessive ferrite, metals such as iron, cobalt and nickel or alloys and their mixtures of the said metals with such metals as aluminum, copper, magnesium, tin, zinc, calcium, titanium, tungsten or vanadium.

Every toner composition according to the present invention can be used as it is, namely as a one-component toner. It can also be mixed with a carrier for use as a so-called two-component toner.

In electrophotographic process, it is required that the toner is instantaneously chargeable by friction with a charging stuff, and that the toner charge is stable in time and under environmental condition such as temperature and humidity. In general the toner material could contain styrene-acrylic or polyester resin.

The styrene-acrylic resins are copolymer of styrene and acrylate ester and/or methacrylate ester, and include, for example, styrene-methyl acrylate, styrene-ethyl acrylate, styrene-butyl acrylate, styrene-octyl acrylate, styrene-methyl methacrylate, styrene-ethyl methacrylate or styrene-butyl methacrylate.

Polyester resins consist of polyhydric alcohol and polybasic acid and are obtained by polymerizing a monomer composition as required in which at least either polyhydric alcohol or polybasic acid contains a trivalent or polyvalent component (crosslinking component). These polyester resins can be synthesized by any ordinary process. Specifically, the reaction condition may be selected according to the reactivity of the used monomer such as reaction temperature (170 to 250° C.) and reaction pressure (5 mmHg to ordinary pressure), and may be stopped when the prescribed properties are attained.

The dihydric alcohols used for synthesizing the polyester resins include, for example, ethylene glycol, triethylene glycol, 1,2-propylene glycol, 1,3-propylene glycol, 1,4-butandiol, neopentyl glycol, 1,4-butendiol, 1,4-bis (hydroxymethyl) cyclohexane, bisphenol A, hydrogenated bisphenol A, polyoxyethylene bisphenol A, polyoxypropylene (2,2)-2,2'-bis (4-hydroxyphenyl) propane, polyoxypropylene (3,3)-2, 2-bis (4-hydroxyphenyl) propane, polyoxyethylene (2,2)-2, 2-bis (4-hydroxyphenyl) propane or polyoxypropylene (2,2)-2,2'-bis (4-hydroxyphenyl) propane.

The trihydric or polyhydric alcohols involved in crosslinking the polyesters include, for example, sorbitol, 1,2,3, 6-hexanetetrole, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2, 4-butanetriol, trimethylol ethane, trimethylol propane or 1,3,5-trihydroxymethylbenzene.

The polybasic acids include, for example, maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, malonic acid, alkenylsuccinic acids such as n-dodecenylsuccinic acid and n-dodecylsuccinic acid, alkylsuccinic acids, other divalent organic acids and anhydrides or lower alkyl ester of the said acids.

The trivalent or polyvalent polybasic acids involved in crosslinking the polyesters include, for example, 1,2,4-benzenetricarboxylic acid, 1,2,5-benzenetricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylenecarboxypropane, tetra (methylenecarboxyl) methane, 1,2,7,8-octanetetracarboxylic acid and the anhydrides of the above.

The advantage of the inventive hydrophobic silica is the insensitiveness to environmental humidity.

Average Primary Particle Size and Aspect Ratio

An average primary particle size is calculated as following. Long and short axis of each primary particle are measured for more than 1,000 particles which are randomly selected from the silica powder by analyzing images obtained by a transmission electron microscope with a magnification of 100,000 times. The total particle size of the long and the short axis is divided by (2*number of particles) for giving the average primary particle size.

The aspect ratio is given by (total of long axis)/(total of short axis).

Adsorbed Moisture Measurement

Moisture adsorption amount of the surface-modified hydrophobic silica powder is determined by using BELSO-ROP-max at 25° C. Each sample is heated at 150° C. under the pressure less than 10 Pa for 3 hours to eliminate adsorbed moisture as pre-treatment. Water vapor adsorption amount is measured at 25° C. under respective 20% (C) and 80% (B) of the vapor pressure of water to the equilibrium vapor pressure of water.

Measurement of Tribo-Electrostatic Charge of Toner 2 g of toner sample and 48 g of ferrite carrier are put into a glass container (75 ml) and stood still for 24 hours in HH environment and in LL environment, respectively. HH environment means here an atmosphere having the temperature of 40° C. and the relative humidity of 85%, while LL environment means an atmosphere having the temperature of 20° C. and the relative humidity of 20%. After being stored for 24 hours in the said environment, the mixture is shaken for a 5 minutes by means of TURBULA® shaker-mixer, respectively. Then, 0.2 g of this mixture is taken and blown with air for 1 minute by means of blowoff charge measuring device TB-200 (Toshiba Chemical) to obtain the charge amount of the toner composition in each HH and LL environment.

Hydrophobicity

First, 1 g of hydrophobic silica powder is weighed and placed in a 200 ml separating funnel, and 100 ml of pure water is added. After putting a lid on it, the mixture is shaken by a turbular mixer for 10 minutes. Then the mixture stood still for 10 minutes. 20 to 30 ml of its turbid lower layer is discarded from the funnel. A part of the resulted water layer is fractionated into a 10 mm quartz cell which is then placed in a colorimeter. Hydrophobicity (%) is measured as light transmittance (%) with the wavelength at 500 nm.

Carbon Content

Carbon content of the hydrophobized silica powder in the examples and comparative examples was measured by means of ISO3262-19.

pH-Value of Hydrophilic Silica Powder 4 g of hydrophilic silica powder is dispersed in 100 g of de-ionized water with a magnetic stirrer. pH-value of the dispersion is measured with a pH meter.

pH-Value of Hydrophobic Silica Powder 4 g of hydrophobic silica powder is dispersed in a mixture of 50 g of methanol and 50 g of de-ionized water with a magnetic stirrer. pH-value of the dispersion is measured with a pH meter.

Moisture Content 1 g of silica powder is weighed in a weighing bottle and heated for two hours at 105° C. in a drying chamber without a lid. After the heating, the bottle is closed with a lid and stored in a desiccator to cool down to 20° C. The weight of the silica powder is weighed. The weight loss of the powder is divided by the initial weight of the sample to determine the moisture content.

EXAMPLES

Hereinafter, the present invention is more specifically described by referring to Examples and Comparative Examples.

Commercially available aqueous dispersions IDISIL™ EM13530P, EM7530P or EM5530P (Evonik Industries AG) were de-ionized by a cation exchanger (Lewatit® S 108 H, purchased from Lanxess AG) so that a pH-value of 2.5-3.0 was obtained. Afterwards the dispersion was frozen with liquid nitrogen and freeze-dried under room temperature at a pressure of 0.2 mbar with a Christ Alpha 2-4 LDplus Freeze Dryer for longer than 10 hours in the first drying step. For the second drying step the pressure was decreased to 0.05 mbar for at least 2 hours to give hydrophilic silica powder.

The powder underwent the aging treatment for 1 hour at a temperature that is mentioned in Table 1 in a drying oven.

In a reaction container 100 parts by weight of the aged silica from step c was added. The powder was fluidized by mixing. The described amount by weight of hydrophobing reagent was sprayed on it under nitrogen atmosphere as shown in Table 1. This reaction mixture was fluidized for the period at the temperature as listed under nitrogen atmosphere. The resulted mixture was cooled to yield a hydrophobic silica powder.

TABLE 1

| | | Aging | | Surface modification | | | | Hydro- | |
|---|---|---|---|---|---|---|---|---|---|
| Example | Silica dispersion | temp. (° C.) | time (h) | Surface modifier | Amount (parts) | temp. (° C.) | time (h) | phobicity (%) | pH |
| C 1 | EM13530P | — | — | HMDS | 5 | 200 | 1 | 22 | 8.3 |
| C 2 | EM13530P | 90 | 1 | HMDS | 5 | 200 | 1 | 35 | 7.6 |
| E 1 | EM13530P | 110 | 1 | HMDS | 5 | 200 | 1 | 66 | 7.5 |
| E 2 | EM13530P | 130 | 1 | HMDS | 5 | 200 | 1 | 81 | 6.3 |

TABLE 1-continued

| Example | Silica dispersion | Aging temp. (° C.) | time (h) | Surface modifier | Amount (parts) | Surface modification temp. (° C.) | time (h) | Hydrophobicity (%) | pH |
|---|---|---|---|---|---|---|---|---|---|
| E 3 | EM13530P | 160 | 1 | HMDS | 5 | 200 | 1 | 79 | 6.6 |
| C 3 | EM13530P | 190 | 1 | HMDS | 5 | 200 | 1 | 51 | 6.4 |
| C 4 | EM13530P | 220 | 1 | HMDS | 5 | 200 | 1 | 42 | 6.4 |
| C 5 | EM13530P | 90 | 1 | OCTMO | 5 | 200 | 1 | 45 | 4.9 |
| E 4 | EM13530P | 130 | 1 | OCTMO | 5 | 200 | 1 | 80 | 4.7 |
| E 5 | EM13530P | 160 | 1 | OCTMO | 5 | 200 | 1 | 83 | 4.9 |
| C 6 | EM7530P | 90 | 1 | HMDS | 8 | 200 | 1 | 24 | 8.5 |
| E 6 | EM7530P | 110 | 1 | HMDS | 8 | 200 | 1 | 64 | 7.0 |
| E 7 | EM7530P | 130 | 1 | HMDS | 8 | 200 | 1 | 75 | 7.1 |
| E 8 | EM7530P | 160 | 1 | HMDS | 8 | 200 | 1 | 77 | 6.9 |
| C 7 | EM7530P | 190 | 1 | HMDS | 8 | 200 | 1 | 51 | 7.2 |
| C 8 | EM5530P | 90 | 1 | HMDS | 10 | 200 | 1 | 36 | 6.9 |
| E 9 | EM5530P | 110 | 1 | HMDS | 10 | 200 | 1 | 72 | 6.4 |
| E 10 | EM5530P | 130 | 1 | HMDS | 10 | 200 | 1 | 70 | 6.5 |

Two-component toner powder was used which consisted of negatively charged styrene-acrylic resin with average particle size at 8 μm manufactured by a grinding method. The toner powder and each hydrophobic silica powder in the table 2 were mixed together to have the ratio which was calculated by the following equation:

Silica (parts by weight)=Average primary particle size of the silica powder (nm)/40

The above mixture was added to a Henschel-type mixer (Super Mixer Piccolo SMP-2 by Kawata MFG Co., Ltd.), then stirred for 1 minute at 600 rpm followed by 3 minutes at 3,000 rpm to yield a toner composition.

Tribo-electrostatic charge of the toner composition was measured under HH and LL conditions. The result is shown in Table 2. The absolute value of the charge was always bigger in LL conditions for any specimen. The smaller the ratio of their charge amount means the more stable toner composition under various environment.

TABLE 2

| Ex. | Carbon content (wt %) | C (wt %) | B (wt %) | B/C | D (nm) | B*D (nm) | LL (μC/g) | HH (μC/g) | LL/HH |
|---|---|---|---|---|---|---|---|---|---|
| C 1 | 0.84 | 1.9 | 5.2 | 2.7 | 132 | 686 | −14 | −4.9 | 2.9 |
| C 2 | 0.81 | 1.4 | 3.9 | 2.8 | 132 | 515 | −20 | −6.4 | 3.1 |
| E 1 | 0.81 | 1.3 | 2.6 | 2.0 | 132 | 343 | −22 | −15 | 1.5 |
| E 2 | 0.78 | 1.3 | 2.4 | 1.8 | 132 | 317 | −22 | −15 | 1.5 |
| E 3 | 0.8 | 1.2 | 2.3 | 1.9 | 132 | 304 | −23 | −16 | 1.4 |
| C 3 | 0.73 | 0.73 | 2.4 | 3.3 | 132 | 317 | −29 | −10 | 2.9 |
| C 4* | 0.65 | 0.71 | 2.4 | 3.4 | 132 | 317 | — | — | — |
| C 5 | 1.6 | 1.2 | 3.3 | 2.8 | 132 | 436 | −22 | −6.5 | 3.4 |
| E 4 | 1.4 | 0.81 | 1.3 | 1.6 | 132 | 172 | −27 | −19 | 1.4 |
| E 5 | 1.4 | 0.74 | 1.3 | 1.8 | 132 | 172 | −28 | −18 | 1.6 |
| C 6 | 1.5 | 2.6 | 7.9 | 3.0 | 77 | 608 | −30 | −3.5 | 8.6 |
| E 6 | 1.3 | 2.2 | 4.5 | 2.0 | 77 | 347 | −38 | −24 | 1.6 |
| E 7 | 1.3 | 2.1 | 3.9 | 1.9 | 77 | 300 | −37 | −21 | 1.8 |
| E 8 | 1.4 | 1.7 | 3.9 | 2.3 | 77 | 300 | −37 | −22 | 1.7 |
| C 7 | 1.2 | 1.2 | 3.9 | 3.3 | 77 | 300 | −55 | −20 | 2.8 |
| C 8 | 1.5 | 3.1 | 10.7 | 3.5 | 55 | 589 | −45 | −8 | 5.6 |
| E 9 | 1.6 | 2.7 | 5.8 | 2.1 | 55 | 319 | −53 | −29 | 1.8 |
| E 10 | 1.4 | 2.5 | 5.7 | 2.3 | 55 | 314 | −52 | −30 | 1.7 |

*C 4 was so aggregated that it was not dispersible on the surface of toner particle.

In Table 2 the inventive hydrophobic silica powders show lower LL/HH ratios, which result in an improved insensitiveness to environmental humidity.

What is claimed is:

1. A hydrophobic silica powder, which has the following physicochemical properties:

average primary particle size (D) is 30-2000 nm, $65 < B*D < 430$, whilst B stands for weight % of adsorbed water vapor on silica (100 weight %) when the partial pressure of water to the equilibrium vapor pressure of water at 25° C. is 80% and D stands for average primary particle size (nm) of the silica powder, $B/C < 2.7$, whilst C stands for weight % of adsorbed water vapor on silica (100 weight %) when the partial pressure of water to the equilibrium vapor pressure of water at 25° C. is 20%, and carbon content (weight %)>0.30.

2. The hydrophobic silica powder according to claim 1, characterized in that its hydrophobicity is higher than 50%.

3. The hydrophobic silica powder according to claim 1, characterized in that it is a colloidal silica powder.

4. The hydrophobic silica powder according to claim 1, characterized in that the aspect ratio is 1.0-1.5.

5. The hydrophobic silica powder according to claim 1, characterized in that the hydrophobicity is higher than 55%.

6. A process for the preparation of hydrophobic silica according to claim 1, characterized in that it comprises the following steps:

a. preparation of the silica dispersion, b. drying the dispersion of step a to obtain hydrophilic silica powder, c. aging treatment of the silica powder of step b at a temperature between 100 and 170° C. and the temperature of step c is higher than the temperature of step b, d. hydrophobizing the silica powder of step c.

7. The process for the preparation of hydrophobic silica according to claim 6, characterized in that the silica dispersion in step a is prepared by reacting an alkoxy silane or alkaline water glass and acid.

8. The process for the preparation of hydrophobic silica according to claim 6, characterized in that the drying in step b is carried out in a freeze dryer.

9. The process for the preparation of hydrophobic silica according to claim 6, characterized in that the aging treatment of step c is carried out in a drying oven.

10. The process for the preparation of hydrophobic silica according to claim 6, characterized in that the hydrophobizing of step d is carried out by spraying a hydrophobing agent on the silica of step c.

11. The process for the preparation of hydrophobic silica according to claim 10, characterized in that the hydrophobing agent is an alkylsilane, a polydimethyl siloxane or a silazane.

12. A toner composition for electrophotography containing at least one hydrophobic silica powder according to claim 1.

* * * * *